United States Patent
Troberg et al.

(10) Patent No.: US 10,056,767 B2
(45) Date of Patent: Aug. 21, 2018

(54) BATTERY PROTECTION HAVING CONTROLLABLE SWITCHING ELEMENTS

(71) Applicant: Microsoft Technology Licensing, LLC, Redmond, WA (US)

(72) Inventors: Mikael Troberg, Salo (FI); Jani Mäki, Turku (FI); Tommi Sermi, Turku (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 15/191,102

(22) Filed: Jun. 23, 2016

(65) Prior Publication Data

US 2017/0373514 A1    Dec. 28, 2017

(51) Int. Cl.
*H01M 10/44* (2006.01)
*H01M 10/46* (2006.01)
*H02J 7/00* (2006.01)

(52) U.S. Cl.
CPC .......... *H02J 7/0026* (2013.01); *H02J 7/0031* (2013.01)

(58) Field of Classification Search
CPC ...... H02J 7/0013; H02J 7/0021; H02J 7/0026; H02J 7/0029
USPC .......................... 320/107, 114, 116, 134, 136
See application file for complete search history.

(56) References Cited

U.S. PATENT DOCUMENTS

| | | | |
|---|---|---|---|
| 4,659,977 A | 4/1987 | Kissel et al. | |
| 5,142,215 A | 8/1992 | Mathison | |
| 5,498,950 A * | 3/1996 | Ouwerkerk | B60L 11/1861 320/119 |
| 5,602,460 A | 2/1997 | Fernandez et al. | |
| 5,867,008 A | 2/1999 | Du et al. | |
| 6,046,575 A | 4/2000 | Demuro | |
| 6,177,780 B1 | 1/2001 | Roy et al. | |
| 7,538,519 B2 | 5/2009 | Daou et al. | |
| 8,355,231 B2 | 1/2013 | Lee et al. | |
| 8,559,151 B2 | 10/2013 | Huber et al. | |
| 8,687,338 B2 | 4/2014 | Odaohhara | |
| 2011/0151285 A1 | 6/2011 | Hong et al. | |
| 2011/0156650 A1* | 6/2011 | Yang | H02J 7/0014 320/118 |
| 2013/0241477 A1* | 9/2013 | Kao | H02J 7/025 320/108 |
| 2014/0342191 A1 | 11/2014 | Shin | |
| 2014/0347776 A1 | 11/2014 | Na et al. | |
| 2014/0354238 A1 | 12/2014 | Moreno et al. | |
| 2016/0033125 A1* | 2/2016 | Krichtafovitch | F23Q 3/00 431/2 |

OTHER PUBLICATIONS

"Lithium-Ion Battery Pack Protection Circuit", Published on: Jan. 1999, 18 pages, Available at: http://www.ti.com/lit/ds/symlink/lm3641.pdf.

Jackson, Bill, "Battery Circuit Architecture", Retrieved on: Apr. 21, 2016, 9 pages, Available at: http://www.ti.com/lit/ml/slyp087/slyp087.pdf.

* cited by examiner

*Primary Examiner* — Edward Tso

(57) ABSTRACT

A device includes a rechargeable battery and a charging line, connected to a terminal of the rechargeable battery, charging the rechargeable battery. The charging line includes two switching elements electrically opening or closing the charging line, and a sense line, connected to a terminal of the rechargeable battery, sensing a battery voltage. The sense line includes two switching elements electrically opening or closing the sense line.

20 Claims, 7 Drawing Sheets

BATTERY PROTECTION HAVING CONTROLLABLE SWITCHING ELEMENTS

BACKGROUND

Rechargeable batteries may be used in multiple applications, ranging from portable music devices, mobile phones to electric vehicles. Recharging a battery may take time, due to various charging requirements to be fulfilled. Rechargeable batteries may have multiple charging constraints for proper charging and maintaining a desired performance level. If these constraints are not followed during charging, the batteries may be damaged and/or cause damage to the device and even injure the user in extreme cases. Some of these constraints include maximum permissible charging voltage, target battery voltage, maximum permissible charging current, permissible battery temperature etc. Some or all of these parameters may need to be monitored.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A battery protection device is described. In an embodiment a device, comprises: a rechargeable battery; a charging line, connected to a terminal of the rechargeable battery, charging the rechargeable battery, wherein the charging line comprises two switching elements electrically opening or closing the charging line; and a sense line, connected to a terminal of the rechargeable battery, sensing a battery voltage, wherein the sense line comprises two switching elements electrically opening or closing the sense line.

In other embodiments, a battery protection circuit and a method are discussed.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

Figure 1:
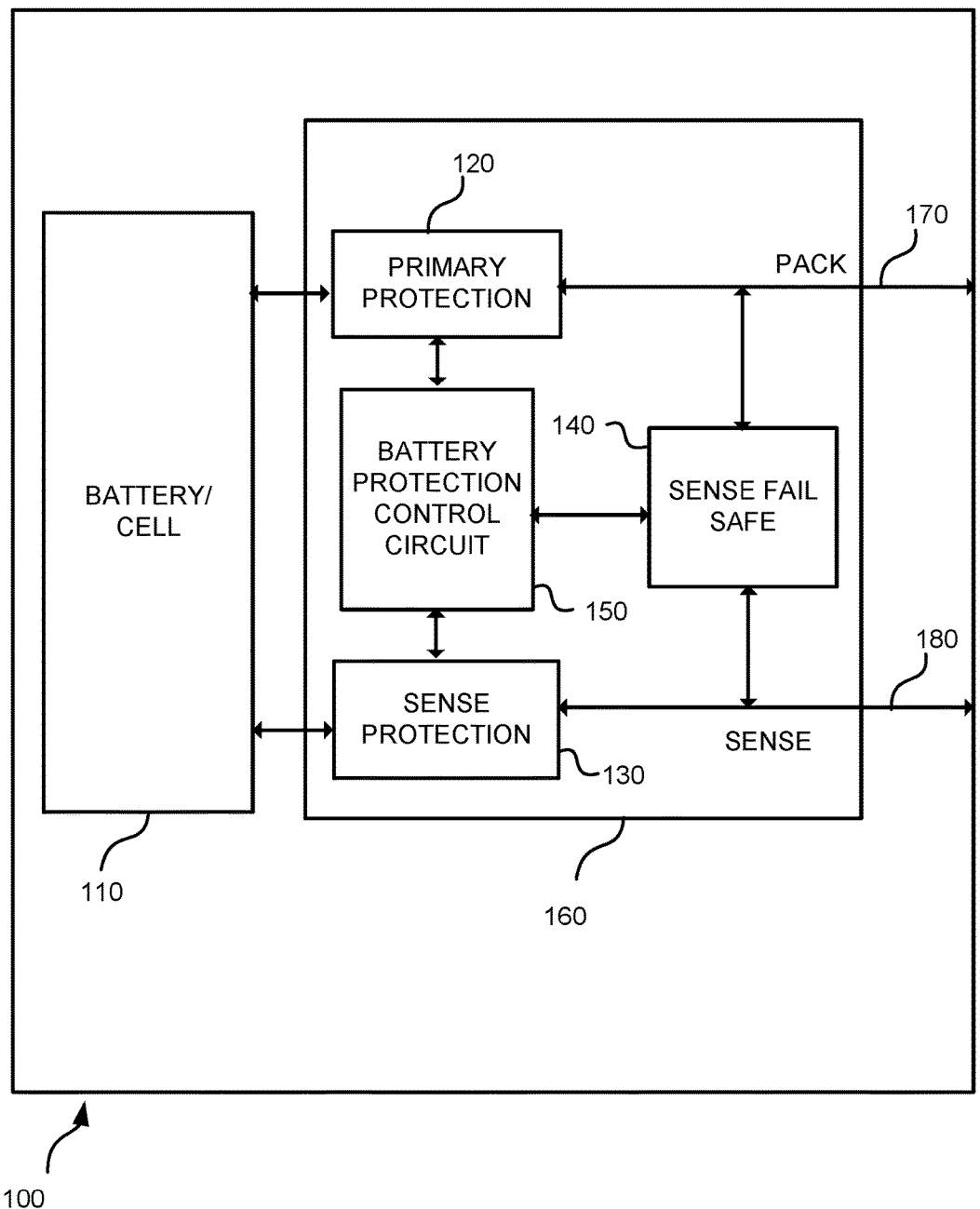
FIG. 1 illustrates a schematic representation of a block diagram of a device with battery protection, according to an embodiment.

The detailed description provided below in connection with the appended drawings is intended as a description of the embodiments and is not intended to represent the only forms in which the embodiment may be constructed or utilized. However, the same or equivalent functions and structures may be accomplished by different embodiments.

Although the embodiments may be described and illustrated herein as being implemented in a mobile device, for example a smartphone, this is only an example implementation and not a limitation. As those skilled in the art will appreciate, the present embodiments are suitable for application in a variety of different types of appliances and devices powered by rechargeable batteries, for example mobile phones, portable media players, tablets, portable computers, tools with rechargeable batteries, electric vehicles, high power batteries, real estate high power batteries, rechargeable power backups etc.

In devices comprising rechargeable batteries, charging lines may be connected to the terminals for charging the batteries and/or driving a load. However for safety and/or optimal operation, there may be intermediate circuitry between the battery and charger and/or load. For high current charging, direct charging, quick charging, calculating state of charge of the battery or for driving a load optimally, an accurate measure of battery voltage may be needed. Charging lines may not provide an accurate measure of battery because there may be a voltage drop across the intermediate circuitry. Sense lines may be used to electrically reach the battery terminals directly to accurately measure battery voltage. Sense lines may expose the battery to external fault conditions. Low impedance of sense lines may result in current leakage. Using a high impedance in sense lines to limit current may cause heat loss and/or loss of accuracy. Configuring electronic switches, for example, field effect transistors, FETs, on one or both sense lines may make it possible to electrically disconnect sense lines when external fault conditions are detected. According to some embodiments, sense lines may be electrically disconnected when overcharging or over discharging of the battery are detected. Further using electronic switches may enable integration of battery protection circuitry, including sense protection, in a single package for example in the form of an integrated circuit. This may reduce size of the protection circuitry. According to an embodiment, enhanced protection may be provided by using protection including charging line protection, which may be called primary protection and sense protection in cascade. According to an embodiment a rechargeable battery can be recharged quickly and safely. A battery may comprise a single cell or multiple cells. According to an embodiment, protection and monitoring may be provided at individual cell and/or battery level. According to an embodiment, line, as for example used in charge or pack line, voltage or power line, ground line, sense line or in a similar manner, may refer to an electrical connection comprising one or more electrical and/or electronic components.

FIG. 1 illustrates a schematic representation of a block diagram of a device 100, comprising battery protection, according to an embodiment. The device 100 comprises a battery 110, and a battery protection circuit 160, the battery 110 being electrically connected to the battery protection circuit 160. The battery protection circuit 160 comprises a primary protection 120 and a sense protection 130, electrically connected to the battery 110. The battery protection circuit 160 may further comprise a battery protection control circuit 150 and a sense fail safe 140.

Referring to FIG. 1, primary protection 120 and sense protection 130 are electrically connected to the battery 110 and to battery protection control circuit 150. Primary protection 120 and sense protection may have electrical connections, 170, 180 to the outside of battery protection circuit 160 or to the outside of device 100. The electrical connections 170 may be used for delivering a charging current to the battery 110, driving a load by the battery 110, etc. and according to some embodiments be called charging lines, load lines or pack lines. The electrical connections 180 may be used for accurately sensing the battery voltage and according to some embodiments be called sense lines. According to an embodiment, the battery 110 may comprise a single rechargeable cell. According to an embodiment, the battery 110 may comprise multiple rechargeable cells connected in series with each other, parallel to each other or a combination thereof. According to an embodiment battery 110 may be chosen from any of the various kinds of rechargeable batteries including, but not limited to, lithium ion batteries, lithium ion polymer batteries, nickel cadmium batteries, nickel metal hydride batteries, etc.

Referring to FIG. 1, the primary protection 120 is configured to be controlled by battery protection control circuit 150. Primary protection 120 electrically disconnects the battery 110 from a load or a charger connected to it through electrical connections 170, based on control signals from the battery protection control circuit 150. Sense protection 130 is configured to be controlled by the battery protection control circuit 150 and may electrically disconnect the battery 110 from any connected circuits or loads via electrical connections 180. This disconnection may be based on control signals by battery protection control circuit 150. The battery protection control circuit 150 may monitor various parameters related to the battery, load, charger etc. and may send control signals to primary protection 120 and/or sense protection 130 to electrically disconnect the battery 110 from connections 170 and/or 180. According to an embodiment, battery protection control circuit 150 may monitor voltage across the battery terminals, for example by using a sense resistor (not shown in FIG. 1), and if the sensed voltage is out of a desirable range, send control signals to primary protection 120 and/or sense protection 130 to electrically disconnect the battery from connections 170 and/or 180, respectively. The desirable voltage range may be pre-specified, for example, during assembly of the circuit or during assembly of the device 100. According to an embodiment, the battery protection control circuit 150 may monitor current flow in or out of battery 110 and if the monitored current is outside a desirable range, cause the primary protection 120 and/or sense protection 130 to electrically disconnect the battery from connections 170 and/or 180, respectively. Sense fail safe 140 may be configured to electrically connect outward charging lines 170 and corresponding outward facing sense lines 180, if a sense line is detected to be in a floating condition, for example, if sense protection 130 malfunctions.

Referring to FIG. 1, sense lines 180 may be used to accurately monitor the battery voltage. Accurate battery voltage may be needed for optimal charging of the battery 110. Sense lines 180 may thus be useful in fast charging, charging with high current, preventing over charging, preventing deep discharge, measuring state of charge of the battery 110 etc. Sense lines 180 may, however, expose the battery to external fault conditions. Using a high impedance in the sense lines 180 to limit current withdrawal may raise temperature to undesirable levels. Low impedance sensing path may lead to leakage of current from the battery 110, exposing it to external fault conditions. According to an embodiment, sense protection 130 may prevent leakage of current from the battery 110. According to an embodiment, sense protection 130 may prevent over charging of battery 110. According to an embodiment, sense protection 130 may isolate battery 110 from external fault conditions.

Figure 2:
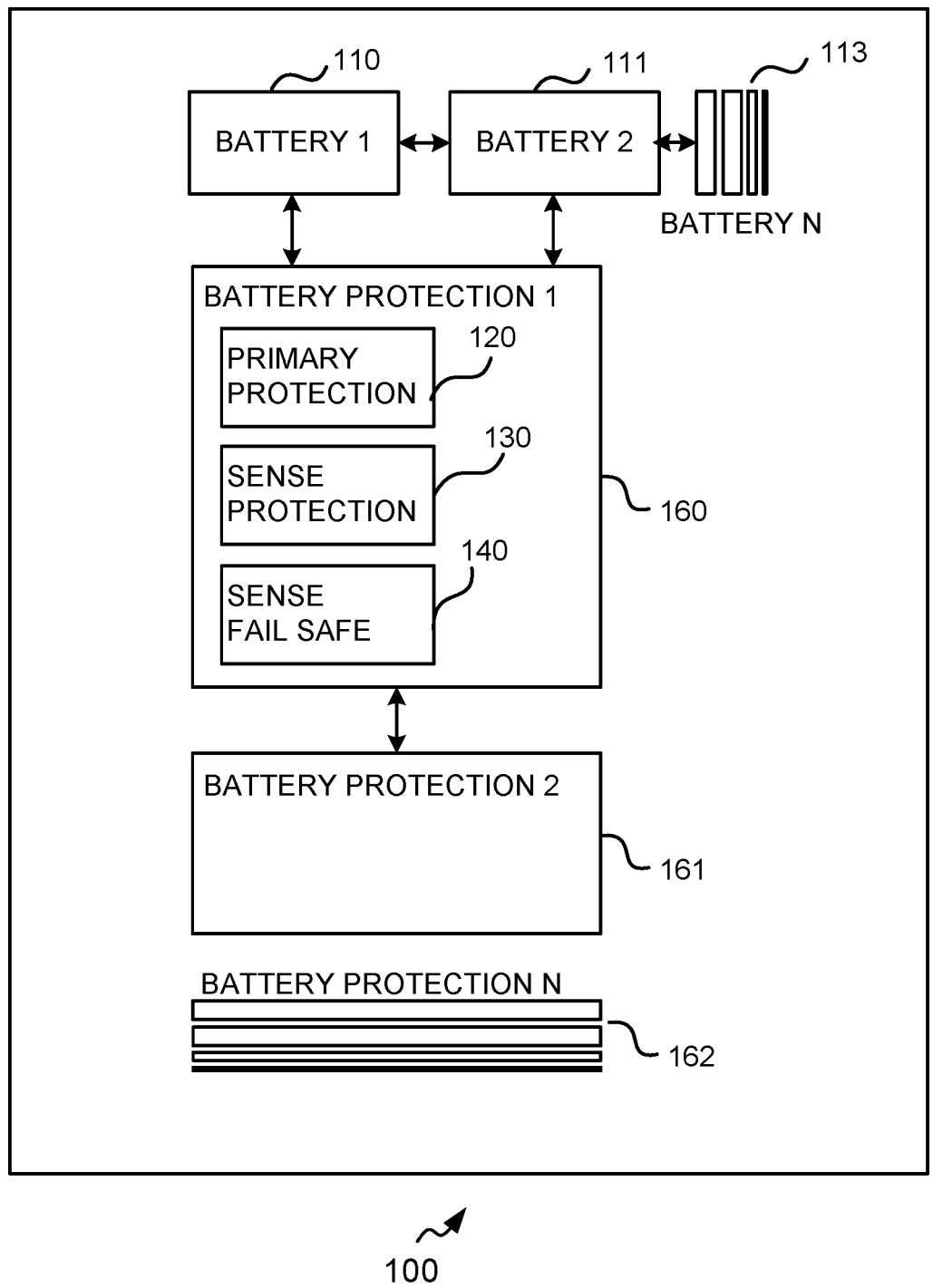
FIG. 2 illustrates a schematic representation of a block diagram of a device comprising battery protection of multiple batteries in parallel, according to an embodiment.

FIG. 2 illustrates a schematic representation of a block diagram of a device comprising battery 1, 110, battery 2, 111, multiple other batteries 113, battery protection circuit 1, 160, battery protection circuit 2, 161, multiple battery protection circuits 162. Referring to FIG. 2, multiple batteries are electrically connected in parallel with battery protection according to an embodiment. Battery 110 is electrically connected in parallel with battery 111. According to an embodiment, there may be multiple batteries 113 connected in parallel to batteries 110 and 111. The batteries are electrically connected to battery protection circuit 1, 160. Battery protection circuit 1, 160, comprises a primary protection 120, a sense protection 130 and a sense fail safe 140. According to an embodiment, battery protection circuit 160 may be implemented as battery protection circuit 160 of FIG. 1. According to an embodiment, another battery protection circuit 161 may be connected in parallel to battery protection circuit 160 for redundancy. According to an embodiment, multiple battery protection circuits 162 may be connected in parallel to provide desired levels of redundancy. According to an embodiment, battery protection circuits 160, 161, 162 may provide redundant protection to batteries 110, 111 and multiple other batteries 113 if configured. According to an embodiment, batteries 110, 111 and 113 may each comprise a single cell or multiple cells. According to an embodiment battery protection circuits 160 and 161 may be integrated in the same package. According to an embodiment, a scalable and integrated battery protection solution may be provided.

Figure 3:
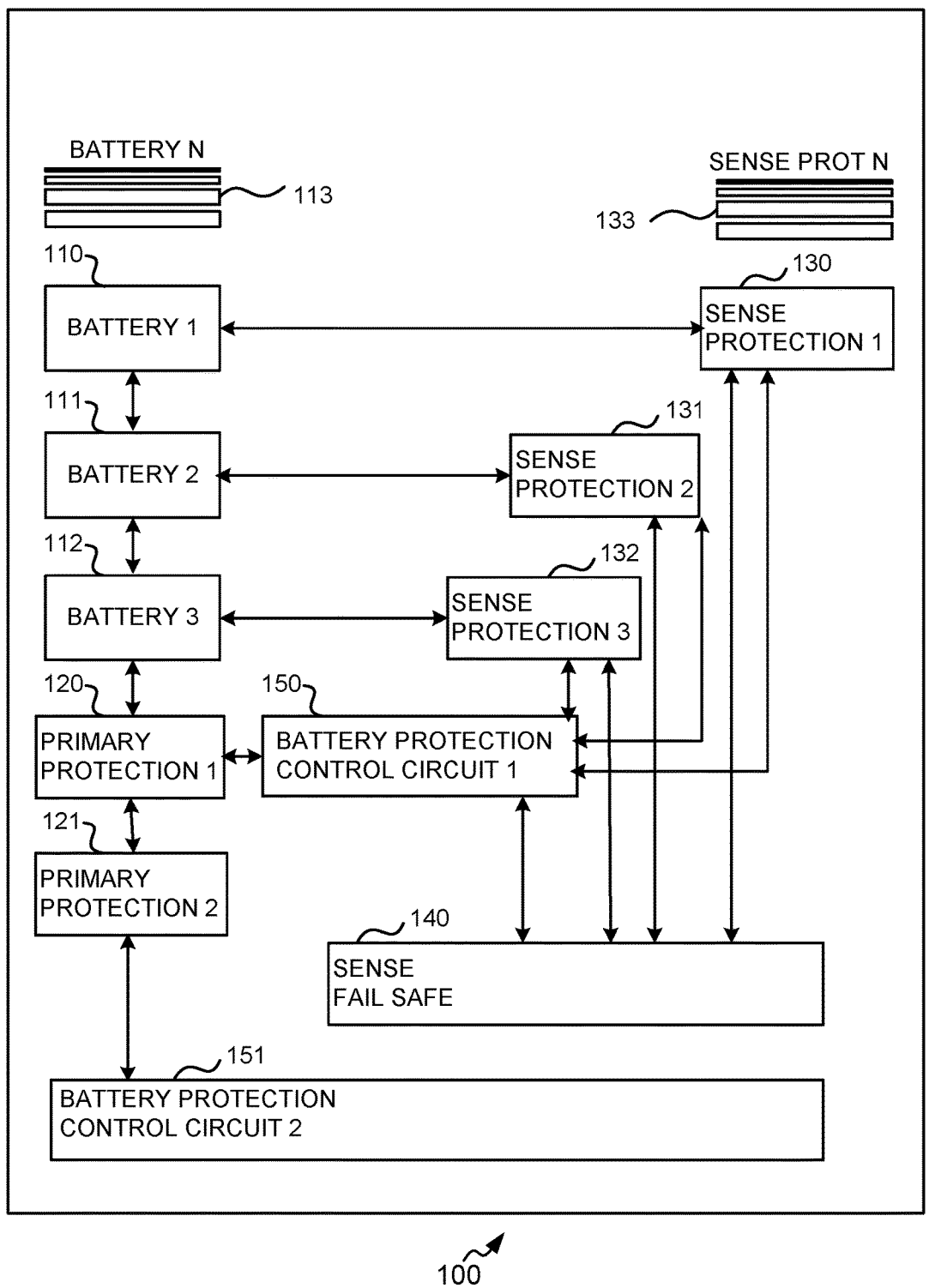
FIG. 3 illustrates a schematic representation of a block diagram of a device comprising battery protection of multiple batteries in series with each other, according to an embodiment.

FIG. 3 illustrates a schematic representation of a block diagram of a device comprising batteries 110, 111,112,113; two primary protections: primary protection 1, 120, primary protection 2, 121, sense protections 130, 131, 132; sense fail safe 140, and two battery protection control circuits: battery protection control circuit 1,150, battery protection control circuit 2, 151. Referring to FIG. 3, batteries 110, 111 and 112 are electrically connected in series. According to an embodiment, multiple batteries 113 may be connected in series with batteries 110, 111, 112. Sense lines connected to terminals of each battery 110, 111, 112 are protected by sense protections 130, 131 and 132 respectively. Further sense fail safe 140 is configured beyond sense protections 130, 131, 132. In embodiments comprising additional series batteries 113, corresponding sense protections 133 may be connected. Further primary protection 1, 120 is connected to the series configuration of batteries 110,111,112 and 113 if present. Battery protection control circuit 1, 150 is configured to control the sense protections 130, 131, 132 primary protection 120 and sense fail safe 140. According to an embodiment, an additional battery protection circuit comprising primary protection 2, 121 and battery protection control circuit 2, 151 and corresponding sense protections (not shown in FIG. 3) may be connected in cascade to the protection comprising primary protection 1, 120, protection control circuit 1, 150, sense protections 130,131,132 and sense fail safe 140. According to an embodiment, multiple such protection configurations may be used in cascade, providing enhanced protection. According to an embodiment, the protection comprising sense protections 130, 131, 132, battery protection control circuits 150, 151, sense fail safe 140 and primary protections 120, 121 may be integrated in the same package. According to an embodiment, additional protection elements like additional primary protections, additional battery protection control circuits, additional sense fail safes, and additional sense protections 133, may be integrated in the same package. According to an embodiment, a package may be an integrated circuit. According to an embodiment, a package may be a printed circuit board.

According to an embodiment, primary protection 1, 120, and primary protection 2, 121 may provide enhanced protection of pack lines. According to an embodiment, sense protections 130, 131, 132 may provide protection of sense lines from individual batteries 110,111,112. According to an embodiment, voltage of each individual battery 110, 111, 112 may be accurately monitored in a safe way. According to an embodiment, if a sense protection 130, 131, 132 fails, sense fail safe 140 may prevent floating sense lines.

Figure 4:
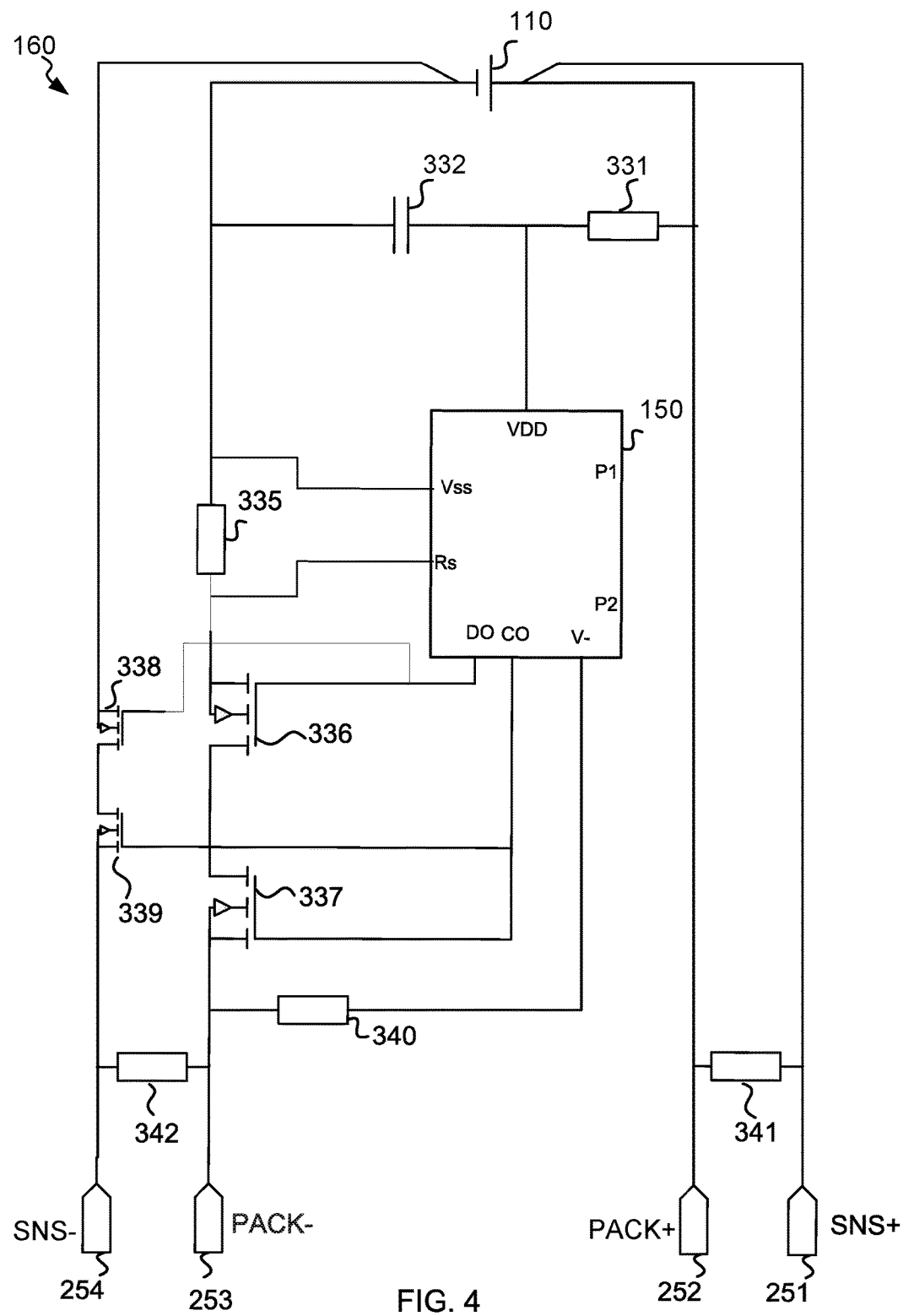
FIG. 4 illustrates a schematic representation of a battery protection circuit, according to an embodiment.

FIG. 4 illustrates a schematic representation of a battery protection circuit 160, connected electrically to a battery 110. The circuit comprises a battery protection control circuit 150, connected to the terminals of battery 110 via components 331, 332 and 340 for power. Components 331, 332 and 340 may be any electrical or electronic component suitable for providing a desirable voltage to the battery protection control circuit 150. According to an embodiment, the desirable voltage may be 12 volts, 6 volts, 3.7 volts, 1.2 volts or any value in between, for example 9 volts or 1.5 volts. According to an embodiment, component 331 and 340 may be resistors of suitable electrical resistance. According to an embodiment, component 332 may be a capacitor of suitable capacitance. The battery protection circuit 160 further comprises sense lines 251, 254 and pack lines 252, 253. Pack line 252 is electrically connected to the positive terminal of battery 110, while sense line 251 is also electrically connected to the positive terminal of battery 110. Pack line 253 is electrically connected to the negative or ground terminal of battery 110 via FETs 336 and 337 which are connected back to back to each other. Back to back connection of FETs may comprise connecting the drain of FET to the source of another FET, connecting the source of one FET to the source of another FET, or connecting the drain of one FET to the drain of another FET. The gate terminal of each of the FETs 336, 337 is connected to battery protection control circuit 150. Sense line 253 is connected to negative or ground of battery 110 via FETs 338 and 339 connected back to back to each other, the gate terminals of FETs 338, 339 being connected to battery protection control circuit 150. According to an embodiment, pack line 253 may comprise a sense resistor 335. Sense resistor 335 may be connected to the battery protection control circuit 150 for sensing battery voltage. According to an embodiment, the battery protection control circuit 150 may sense the battery voltage across FET 336. The battery protection circuit 160 may further comprise sense fail safe components 341 and 342. Sense fail safe component 342 may be connected between pack line 253 and sense line 254 beyond the FETs 338 and 339. Sense fail safe component 341 may be connected between sense line 251 and pack line 252. According to an embodiment, sense fail safe components 341, 342 may be controlled by battery protection control circuit 150. According to an embodiment, the FETs 336, 337, 338 and 339 may be Metal Oxide Semiconductor Field Effect Transistors, MOSFETS. According to an embodiment, the FETs 336, 337, 338 and 339 may be Junction Field Effect Transistors, JFETS.

According to an embodiment, the FETs 336, 337, 338 and 339 may be replaced by a controllable switching elements including, but not limited to, electromagnetic relays, solid state relays, transistors, etc., depending on, for example, operating voltages and currents of battery 110 and charger. According to an embodiment, the battery protection circuit 150, may be control the switching elements by a control voltage or a control current.

Referring to FIG. 4, battery protection control circuit 150 may drive FETs 336, 337 and 338, 339, controlling whether they conduct or not. Battery protection control circuit 150 may monitor battery parameters, for example battery voltage, battery state of charge etc. and control the conduction state of FETs 336, 337, 338, 339 based on that. According to an embodiment, if battery voltage is above an upper threshold, battery protection control circuit 150 may switch the FETs 337 and 339 into a non-conductive state. According to an embodiment, if the battery voltage is below a lower threshold, the battery protection control circuit 150 may switch FETs 336 and 338 into a non-conductive state. The battery protection control circuit 150, may control the conductive state of FETs 336, 337, 338, 339 by applying or removing an electric voltage at their gate terminals. Fail safe components 341 and 342 are configured to be electrically non-conductive if sense lines are working desirably. If a sense line fails, for example if an FET 338 or 339 fails, sense fail safe 342 may be configured to turn into an electrically conductive state, bringing the sense line 254 to the same electric potential as pack line 253. In a similar manner if sense line 251 fails, for example due to an electric disconnection, sense fail safe component 341 may turn electrically conductive, bringing sense line 251 to the same electric potential as pack line 252. According to an embodiment, sense fail components may be controlled by the battery protection control circuit 150. According to an embodiment, a sense fail safe component 341, 342 may comprise a FET. According to an embodiment, the characteristics of FETs 338 and 339 may be different than those of FETs 336 and 337.

According to an embodiment, switching FET 337 into a non-conductive state when the battery voltage is higher than a threshold may prevent the battery from being over charged and/or from being subjected to unsuitably high charging voltages. According to an embodiment, switching FET 336 into a non-conductive state when the battery voltage is lower than a threshold may prevent the battery from being discharged below a desirable level. According to an embodiment, switching the FETs 338 or 339 into a non-conductive state simultaneously when the pack line 253 is electrically opened, by switching FETs 336 or 337, ensures that battery 110 is protected from external fault conditions reaching it via sense lines. According to an embodiment, protected sense lines 251,254 may allow for safe direct charging and/or high current charging.

According to an embodiment, sense fail safe components 342 and 341 may prevent floating sense line scenario. According to an embodiment, sense fail safe components 341 and 342 may allow charging even when FET 338 and/or 339 fail, or sense line are electrically opened due some other failure.

According to an embodiment, circuit 160 may be integrated into a single package. According to an embodiment, the single package may be an integrated circuit comprising terminals for battery and terminals corresponding to sense lines 251, 254 and pack lines 252, 253. According to an embodiment, the single package may be a printed circuit board. According to an embodiment, integrating the battery protection circuit 160 into a single package may reduce size requirement of the circuit 160. According to an embodiment, battery protection circuit 160 of FIG. 1 may be implemented as battery protection circuit 160 of FIG. 4.

Figure 5:
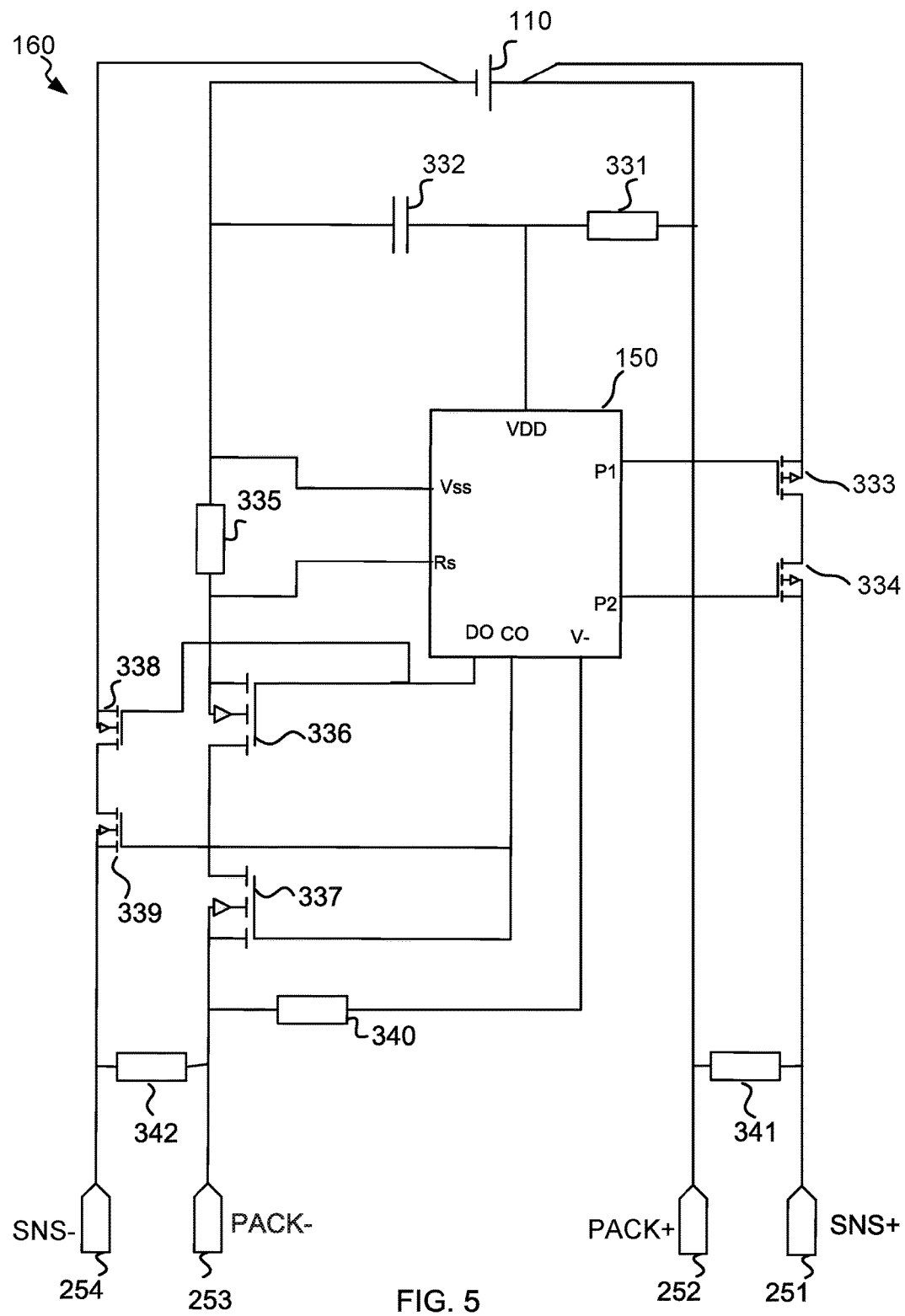
FIG. 5 illustrates a schematic representation of a battery protection circuit with protection on both sense lines, according to an embodiment.

FIG. 5 illustrates a schematic representation of a battery protection circuit 160 with sense line protection on both sense lines 251, 254. An embodiment of illustrated in FIG. 5 may be similar to the embodiment illustrated in FIG. 4, but comprises additional FETs. Referring to FIG. 5, battery protection circuit 160 comprises FETs 333, 334 configured on sense line 251 connected to positive terminal of the battery 110. These FETs are controlled by the battery protection control circuit 150 and may electrically open the sense line 251 in case of external fault condition, overcharge or over discharge of the battery. According to an embodiment, battery protection control circuit 150 may switch FET 333 into an electrically non-conductive state if battery voltage falls below a lower threshold.

According to an embodiment, battery protection control circuit 150 may switch FET 334 into an electrically non-conductive state if battery voltage rises above an upper threshold. According to an embodiment, battery protection circuit 160 may be integrated into a single package.

Referring to FIG. 1 to FIG. 5, battery protection control circuit 150 may comprise means to compare voltages, means to detect fault conditions, means to measure voltage across a sense component 335, means to switch FETs on and off, means to control sense fail safe components 341 and 342. According to an embodiment, battery protection control circuit 150 may comprise a storage, to store threshold battery voltage values. According to an embodiment, the storage may be a ROM, PROM, EEPROM or flash memory.

Figure 6:
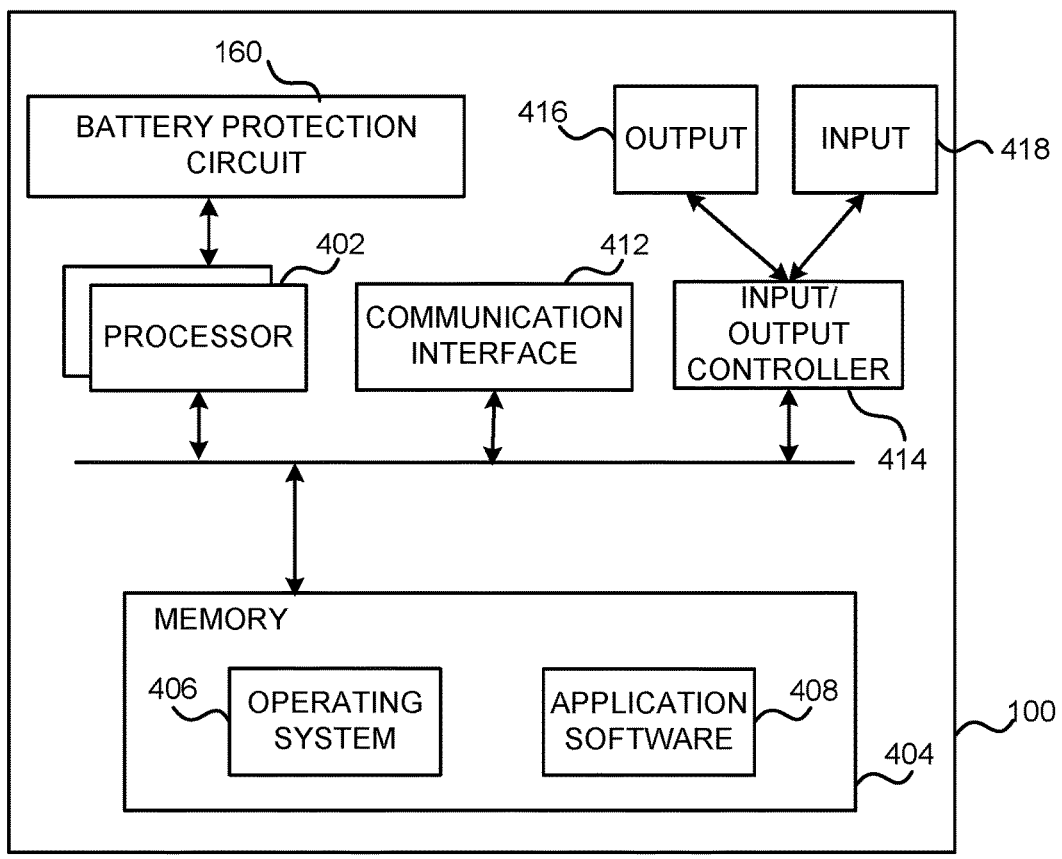
FIG. 6 illustrates a schematic representation of a block diagram of a computing device according to an embodiment.

FIG. 6 illustrates an example of components of a computing device 100 comprising a battery protection circuit 160 and powered by a rechargeable battery (not shown in FIG. 6). The computing device 100 comprises one or more processors 402 which may be microprocessors, controllers or any other suitable type of processors for processing computer executable instructions to control the operation of the device 100. Platform software comprising an operating system 406 or any other suitable platform software may be provided on the device 100 to enable application software 408 to be executed on the device 100.

Computer executable instructions may be provided using any computer-readable media that are accessible by the device 100. Computer-readable media may include, for example, computer storage media such as a memory 404 and communications media. Computer storage media, such as a memory 404, include volatile and non-volatile, removable and non-removable media implemented in any method or technology for storage of information such as computer readable instructions, data structures, or program modules. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, or program modules, in a modulated data signal, such as a carrier wave, or other transport mechanism. Although the computer storage medium (the memory 404) is shown within the device 100, it will be appreciated, by a person skilled in the art, that the storage may be distributed or located remotely and accessed via a network or other communication link (for example using a communication interface 412).

The device 100 may comprise an input/output controller 414 arranged to output information to an output device 416 which may be separate from or integral to the device 100. The input/output controller 414 may also be arranged to receive and process an input from one or more input devices 418. In one embodiment, the output device 416 may also act as the input device. The input/output controller 414 may also output data to devices other than the output device, for example a locally connected printing device. Further the device comprises a battery protection circuit 160 which may be in communication with the processor 402.

According to an embodiment, a rechargeable battery powered device 100, for example as shown in FIG. 1, FIG. 2 or FIG. 3, may be established with the features of FIG. 6. According to an embodiment, the battery protection circuit 160 may be implemented as exemplary illustrated in FIG. 4 or FIG. 5.

Figure 7:
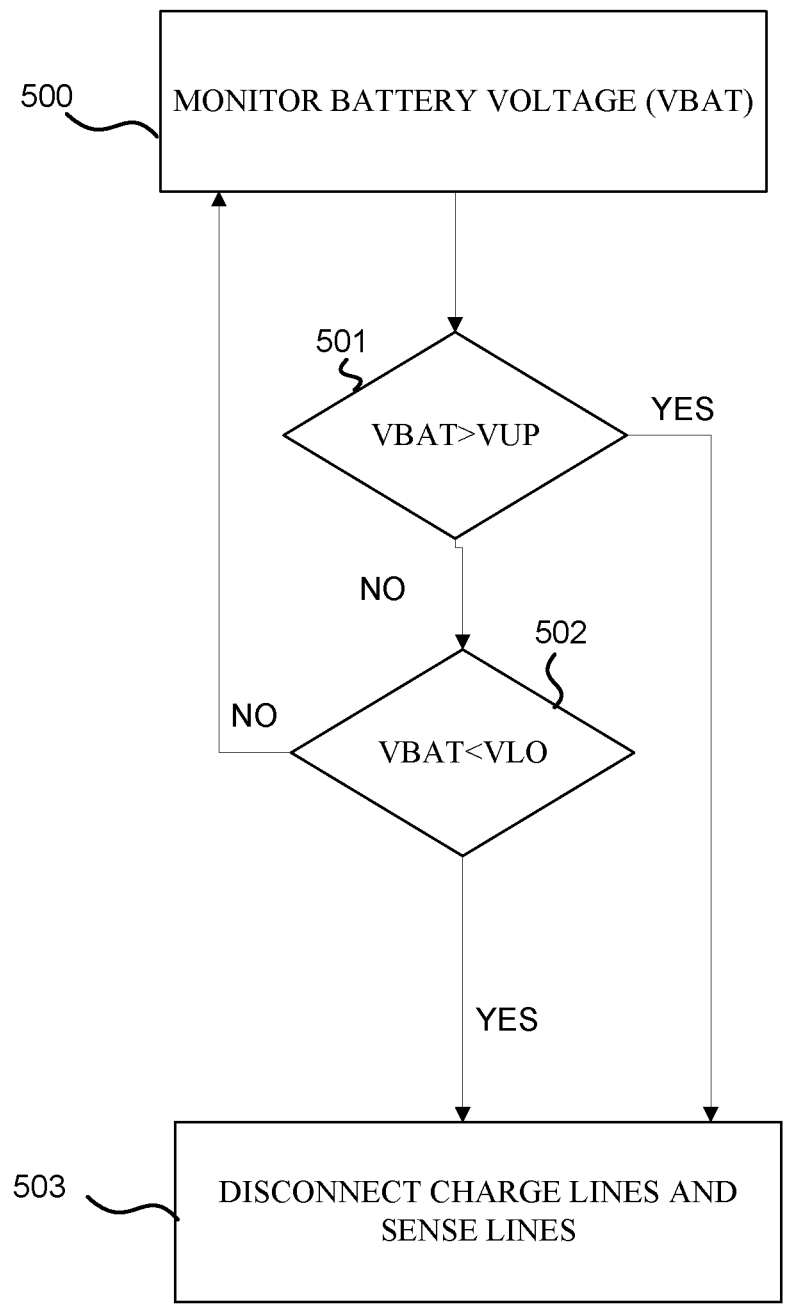
FIG. 7 illustrates a schematic flow chart of a method of battery protection in accordance with an embodiment.

FIG. 7 illustrates, as a schematic flow chart, a method of battery protection in accordance with an embodiment. Referring to FIG. 7, according to an embodiment the process may comprise operations 500, 501, 502 and 503. According to an embodiment, the process of FIG. 7 may be compiled into the program code 406, 408. According to an embodiment, the process of FIG. 7 may be stored in an EEPROM as instructions.

Operation 500 may include monitoring voltage across the terminals of a battery 110, battery voltage continuously. This may be done, for example by calculating battery voltage VBAT as a function of voltage across a sense resistor 335 connected to the battery 110.

Operation 501 may include comparing the measured battery voltage with a predefined upper threshold voltage, VUP. Upper threshold voltage VUP may be predefined based on battery 110 characteristics. For example, it may be the maximum permissible charging voltage. If the battery voltage VBAT is lower than the upper threshold VUP, Operation 502 may be carried out. If the VBAT is higher than VUP, Operation 503 may be carried out.

Operation 502 may in include comparing the measured battery voltage with a predefined lower threshold voltage, VLO. Lower threshold voltage VLO may be predefined based on battery 110 characteristics. For example it may be the minimum permissible discharge voltage. If VBAT is higher than VLO, the process may start again at Operation 500. However, if VBAT is lower than VLO, Operation 503 may be carried out.

Operation 503 may include electrically disconnecting sense lines 170, 251,254 and charging lines 180, 252, 253 from battery. This may be done by switching FETs on charging lines and sense lines into a non-conductive state.

According to an embodiment, the method may further include monitoring the sense lines and if they fail, electrically connecting a failed sense line to the corresponding charging line to prevent floating sense line scenario.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices such as disks, thumb drives, memory etc. and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions. Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The embodiments illustrated and described herein as well as embodiments not specifically described herein but within the scope of aspects of the disclosure constitute exemplary means for protecting sense lines of a battery and exemplary means for battery protection. For example, the elements illustrated in FIG. 1 to FIG. 6 constitute exemplary means protecting a battery from external fault conditions, exemplary means for measuring voltage across terminals of a battery, exemplary means for comparing voltages, exemplary means for electrically opening and/closing a an electrical path, and exemplary means of driving FETs.

According to an embodiment, a device, comprises: a rechargeable battery; a charging line, connected to a terminal of the rechargeable battery, charging the rechargeable battery, wherein the charging line comprises two switching elements electrically opening or closing the charging line; and a sense line, connected to a terminal of the rechargeable battery, sensing a battery voltage, wherein the sense line comprises two switching elements electrically opening or closing the sense line.

Alternatively or in addition to the above, the device further includes a battery protection control circuit configured to drive the switching elements. Alternatively or in addition to the above, the battery protection control circuit and the switching elements for battery protection comprise an integrated circuit. Alternatively or in addition to the above, further comprising at least one additional battery protection control circuit, wherein: the charging line comprising switching elements, comprises at least one additional switching element electrically opening or closing the charging line and configured to be driven by the at least one additional battery protection control circuit; and the sense line comprising switching elements, comprises at least one additional switching element electrically opening or closing the sense line and configured to be driven by the at least one additional battery protection control circuit. Alternatively or in addition to the above, the battery protection control circuit further comprises a sense element. Alternatively or in addition to the above, the battery protection control circuit is configured to monitor a battery voltage. Alternatively or in addition to the above, the battery protection control circuit is configured to turn off at least one switching element comprising the sense line and at least one switching element comprising the charging line, if the monitored battery voltage is above an upper threshold value or below a lower threshold value. Alternatively or in addition to the above, the battery comprises multiple cells, connected in parallel, series or a combination thereof. Alternatively or in addition to the above, the switching elements comprise field effect transistors, FETs. Alternatively or in addition to the above, further comprising a failsafe component between the sense line and the charging line of same polarity configured to electrically connect the sense line and the charging line if at least one of the switching elements comprising the sense line fails.

According to an embodiment, a battery protection circuit, comprising: a battery protection control circuit; two external charge terminals; two external sense terminals; two back to back switching elements electrically connected in between the charge terminals; and two back to back switching elements electrically connected in between the sense terminals; wherein the switching elements are controlled by the battery protection control portion.

Alternatively or in addition to the above, the battery protection control circuit is configured to turn off at least one switching element between the two charge terminals and at least one switching element between the two sense terminals if battery voltage is above a pre-specified upper threshold value. Alternatively or in addition to the above, the battery protection control circuit is configured turn off at least one switching element between the two charge terminals and at least one switching element between the two sense terminals if battery voltage is below a pre-specified lower threshold value. Alternatively or in addition to the above, the battery protection control circuit and the switching elements are integrated in a single integrated package. Alternatively or in addition to the above, comprising a fail-safe component configured between charge and sense terminals of the same polarity, wherein the fail-safe component electrically connects the sense terminal to the corresponding charge terminal if switching elements are configured between the two sense terminals malfunction. Alternatively or in addition to the above, the battery protection control circuit is configured to sense a voltage across a sense element and/or a switching element. Alternatively or in addition to the above, wherein the switching elements comprise field effect transistors, FETs. Alternatively or in addition to the above, further comprising: at least one additional battery protection control circuit; at least two additional external charge terminals; at least two additional external sense terminals; two back to back switching elements electrically connected in between the additional charge terminals; two back to back switching elements electrically connected in between the additional sense terminals; wherein the switching elements are controlled by the at least one additional battery protection control circuit According to an embodiment, a method, performed by a processor, comprises: monitoring a battery voltage; comparing the battery voltage to an upper threshold value; comparing the battery voltage to a lower threshold value; and if the battery voltage is higher than the upper threshold value or lower than the lower threshold value, electrically disconnecting charging lines and sense lines connected to the battery by switching off at least one switching element on at least one charging line and at least one switching element on at least one sense line.

Alternatively or in addition to the above, further comprising: monitoring the sense lines; and if a sense line is detected to be in an electrically floating condition, connecting it to a charging line of the same polarity.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
   a rechargeable battery;
   a charging line, connected to a first terminal of the rechargeable battery, charging the rechargeable battery, wherein the charging line comprises two switching elements electrically opening or closing the charging line; and
   a sense line, connected to a second terminal of the rechargeable battery, sensing a battery voltage, wherein the sense line comprises two switching elements electrically opening or closing the sense line.

2. The device of claim 1, wherein the device further includes a battery protection control circuit configured to drive the switching elements.

3. The device of claim 2, wherein the battery protection control circuit and the switching elements for battery protection comprise an integrated circuit.

4. The device of claim 2 further comprising at least one additional battery protection control circuit, wherein:
   the charging line comprising switching elements, comprises at least one additional switching element electrically opening or closing the charging line and configured to be driven by the at least one additional battery protection control circuit; and
   the sense line comprising switching elements, comprises at least one additional switching element electrically opening or closing the sense line and configured to be driven by the at least one additional battery protection control circuit.

5. The device of claim 2, wherein the battery protection control circuit further comprises a sense element.

6. The device of claim 2, wherein the battery protection control circuit is configured to monitor a battery voltage.

7. The device of claim 6, wherein the battery protection control circuit is configured to turn off at least one switching element comprising the sense line and at least one switching element comprising the charging line, if the monitored battery voltage is above an upper threshold value or below a lower threshold value.

8. The device of claim 1, wherein the battery comprises multiple cells connected in parallel, series or a combination of parallel and series.

9. The device of claim 1, wherein the switching elements comprise field effect transistors, FETs.

10. The device of claim 1, further comprising a failsafe component between the sense line and the charging line of same polarity configured to electrically connect the sense line and the charging line if at least one of the switching elements comprising the sense line fails.

11. A battery protection circuit, comprising:
    a battery protection control circuit;
    two external charge terminals;
    two external sense terminals;
    two back to back switching elements electrically connected in between the charge terminals; and
    two back to back switching elements electrically connected in between the sense terminals;
    wherein the switching elements are controlled by the battery protection control circuit.

12. The circuit of claim 11, wherein the battery protection control circuit is configured to turn off at least one switching element between the two charge terminals and at least one switching element between the two sense terminals if battery voltage is above a pre-specified upper threshold value.

13. The circuit of claim 11, wherein the battery protection control circuit is configured turn off at least one switching element between the two charge terminals and at least one switching element between the two sense terminals if battery voltage is below a pre-specified lower threshold value.

14. The circuit of claim 11, wherein the battery protection control circuit and the switching elements are integrated in a single integrated package.

15. The circuit of claim 11, comprising a fail-safe component configured between charge and sense terminals of the same polarity, wherein the fail-safe component electrically connects the sense terminal to the corresponding charge terminal if switching elements are configured between the two sense terminals malfunction.

16. The circuit of claim 11, wherein the battery protection control circuit is configured to sense a voltage across a sense element, a switching element, or both the switching and sense elements.

17. The circuit of claim 11, wherein the switching elements comprise field effect transistors, FETs.

18. The circuit of claim 11, further comprising:
    at least one additional battery protection control circuit;
    at least two additional external charge terminals;
    at least two additional external sense terminals;
    two back to back switching elements electrically connected in between the additional charge terminals;

two back to back switching elements electrically connected in between the additional sense terminals;
wherein the switching elements are controlled by the at least one additional battery protection control circuit.

19. A method, performed by a processor, comprising
monitoring a battery voltage;
comparing the battery voltage to an upper threshold value;
comparing the battery voltage to a lower threshold value;
and if the battery voltage is higher than the upper threshold value or lower than the lower threshold value, electrically disconnecting charging lines and sense lines connected to the battery by switching off at least one switching element on at least one charging line and at least one switching element on at least one sense line.

20. The method of claim 19, further comprising:
monitoring the sense lines;
and if a sense line is detected to be in an electrically floating condition, connecting it to a charging line of the same polarity.

* * * * *